(12) United States Patent
Antipa et al.

(10) Patent No.: US 8,284,930 B2
(45) Date of Patent: *Oct. 9, 2012

(54) SIMULTANEOUS SCALAR MULTIPLICATION METHOD

(75) Inventors: Adrian Antipa, Brampton (CA); Yuri Poeluev, Waterloo (CA)

(73) Assignee: Certicom Corp., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/177,286

(22) Filed: Jul. 6, 2011

(65) Prior Publication Data

US 2011/0261956 A1     Oct. 27, 2011

Related U.S. Application Data

(63) Continuation of application No. 11/556,531, filed on Nov. 3, 2006, now Pat. No. 8,045,705.

(60) Provisional application No. 60/732,715, filed on Nov. 3, 2005.

(51) Int. Cl.
*H04K 1/00* (2006.01)
*H04L 9/00* (2006.01)
*H04L 9/08* (2006.01)
*H04L 9/32* (2006.01)

(52) U.S. Cl. ............. 380/28; 380/43; 380/45; 380/259; 380/280; 713/170

(58) Field of Classification Search ............. 380/28, 380/43, 45, 259, 280; 713/170
See application file for complete search history.

(56) References Cited

U.S. PATENT DOCUMENTS

| 2003/0026419 A1 | 2/2003 | Akishita |
| 2003/0059043 A1 | 3/2003 | Okeya |
| 2003/0123656 A1 | 7/2003 | Izu et al. |

FOREIGN PATENT DOCUMENTS

| JP | 2002-323852 A | 11/2002 |
| JP | 2003-131568 A | 5/2003 |
| JP | 2003-288013 A | 10/2003 |
| JP | 2003-288014 A | 10/2003 |
| JP | 2004-053814 A | 2/2004 |
| WO | 00/25204 A1 | 5/2000 |

OTHER PUBLICATIONS

Montgomery, Peter L.; "Speeding the Pollard and Elliptic Curve Methods of Factorization"; Mathematics of Computation, Jan. 1987; pp. 243-264; vol. 48, No. 177.

(Continued)

*Primary Examiner* — Mohammad W Reza
(74) *Attorney, Agent, or Firm* — John R. S. Orange; Blake, Cassels & Graydon LLP

(57) ABSTRACT

In computing point multiples in elliptic curve schemes (e.g. kP and sQ) separately using, for example, Montgomery's method for the purpose of combining kP+sQ, several operations are repeated in computing kP and sQ individually, that could be executed at the same time. A simultaneous scalar multiplication method is provided that reduces the overall number of doubling and addition operations thereby providing an efficient method for multiple scalar multiplication. The elements in the pairs for P and Q method are combined into a single pair, and the bits in k and s are evaluated at each step as bit pairs. When the bits in k and s are equal, only one doubling operation and one addition operation are needed to compute the current pair, and when the bits in k and s are not equal, only one doubling operation is needed and two addition operations.

27 Claims, 2 Drawing Sheets

OTHER PUBLICATIONS

Menezes, Alfred J.; Van Oorschot, Paul C.; Vanstone, Scott A.; Handbook of Applied Cryptography; 1997; pp. 617-618; CRC Press LLC.

Akishita, T.; "Fast Simultaneous Scalar Multiplication on Elliptic Curve with Montgomery Form"; Lecture Notes in Computer Science; Jan. 1, 2001; pp. 255 to 267; vol. 2259; Springer-Verlag.

Hankerson, D. et al.; "Software Implementation of Elliptic Curve Cryptography over Binary Fields"; Proceedings of the Second International Workshop on Cryptographic Hardware and Embedded Systems; Lecture Notes in Computer Science; Aug. 17, 2000; pp. 1 to 24; vol. 1965; Springer-Verlag.

Joye, M. et al.; "The Montgomery Powering Ladder"; Revised Papers from the 4$^{th}$ International Workshop on Cryptographic Hardware and Embedded Systems; Lecture Notes in Computer Science; Aug. 13, 2002; pp. 291 to 302; vol. 2523; Springer-Verlag.

Lee, Mun-Kyu; "SPA-Resistant Simultaneous Scalar Multiplication"; In Parallel and Distributed Processing and Applications: Second International Symposium, ISPA 2004 Proceedings, Hong Kong, Dec. 13-15, 2004; pp. 314-321; LNCS; vol. 348; Jan. 2005; Springer, Heidelberg.

Dahmen, E. et al.; "Efficient Left-to-Right Multi-exponentiations"; Nov. 1, 2005; pp. 1 to 8; http://www.cdc.informatik.tu-darmstadt.de/reports/TR/TI-05-02.DOT05a_multiexp.pdf.

Fischer, W. et al.; Parallel scalar multiplication on general elliptic curves over $F_p$ hedged against Non-Differential Side-Channel Attacks; Jan. 9, 2002; http://eprint.iacr.org/2002/007.pdf.

Prins, L.; Supplementary Search Report from corresponding European Application No. 06804680.4; search completed Feb. 24, 2010.

Prins, L.; Search Report from corresponding European Application No. 10189354.3; search completed Jan. 13, 2011.

Akishita, T.; "Fast Simultaneous Scalar Multiplication on Elliptic Curve with Montgomery Form"; Research Report; Information Processing Society of Japan; Jul. 25, 2001; pp. 97 to 103; vol. 75.

$$k = 101101_2 = (k_5k_4k_3k_2k_1k_0)_2 = 45$$

| Step | Current Pair | Bit $k_i$ |
|---|---|---|
| $i = 5$ | (P, 2P) | 1 |
| 4 | (2P, 3P) | 0 |
| 3 | (5P, 6P) | 1 |
| 2 | (11P, 12P) | 1 |
| 1 | (22P, 23P) | 0 |
| 0 | (45P, 46P) | 1 |

PRIOR ART (Montgomery's Method)

Scenario 1: $k$ and $s$ have same bit length $k = 101101_2 = (k_5 k_4 k_3 k_2 k_1 k_0)_2 = 45$
$s = 110110_2 = (s_5 s_4 s_3 s_2 s_1 s_0)_2 = 54$

| Step | Current Pair | Bit-pair: $k_i s_i$ |
|---|---|---|
| $i = 5$ | (P+Q, 2P+2Q) | 11 |
| 4 | (2P+3Q, 3P+4Q) | 01 |
| 3 | (5P+6Q, 6P+7Q) | 10 |
| 2 | (11P+13Q, 12P+14Q) | 11 |
| 1 | (22P+27Q, 23P+28Q) | 01 |
| 0 | (45P+54Q, 46P+55Q) | 10 |

Figure 3

Scenario 2: $k$ and $s$ have different bit lengths $k = 0000101_2 = (k_6 k_5 k_4 k_3 k_2 k_1 k_0)_2 = 5$
$s = 1101101_2 = (s_6 s_5 s_4 s_3 s_2 s_1 s_0)_2 = 109$

| Step | Current Pair | Bit-pair: $k_i s_i$ |
|---|---|---|
| $i = 6$ | (Q, 2Q) | 01 |
| 5 | (3Q, 4Q) | 01 |
| 4 | (6Q, 7Q) | 00 |
| 3 | (13Q, 14Q) | 01 |
| 2 | (P+27Q, 2P+28Q) | 11 |
| 1 | (2P+54Q, 3P+55Q) | 00 |
| 0 | (5P+109Q, 6P+110Q) | 11 |

Figure 4

SIMULTANEOUS SCALAR MULTIPLICATION METHOD

CROSS-REFERENCE TO RELATED APPLICATIONS

This application is a continuation of U.S. patent application Ser. No. 11/556,531 filed Nov. 3, 2006, which claims priority from U.S. Provisional Patent Application No. 60/732,715 filed Nov. 3, 2005, the entire contents of both of which are incorporated herein by reference.

FIELD OF THE INVENTION

The present invention relates generally to the field of cryptography, and has particular utility in elliptic curve cryptography and scalar multiplication methods therefor.

DESCRIPTION OF THE PRIOR ART

In elliptic curve arithmetic, point multiplication refers to an operation where an integer is multiplied by a point on an elliptic curve. It is well known that point multiplication can dominate the execution time of elliptic curve cryptographic schemes.

One method for performing point multiplication to compute a value kP is Montgomery's method, where k is an integer and P is a point on an elliptic curve E. In one implementation of Montgomery's method, the integer value k is represented as a series of binary bits in base 2. Montgomery scalar multiplication computes kP using a sequence starting with the pair (mP,(m+1)P) and the bits in k. The coefficient m is an arbitrary integer representing the coefficient of P in the first term of the previous pair. In the sequence, each pair is obtained from the previous one by doubling one component and adding both components, wherein the order of these operations depends on the value of the bit in k. The sequence begins with a starting pair, and computes a new pair for each bit in k with the exception of the most significant bit. For all pairs, the second component differs from the first component by P. This fact allows for the use of more efficient formulae for point doubling and point addition.

In practice, the sequence starts with the pair (P,2P), where P is the first term, 2P is the second term and thus m=1. The most significant bit of the integer k is discarded, and For each step, if the current bit in k is zero (0) (e.g. for the second step, if the second most significant bit in k is zero . . . ), the current first term will be double the previous first term, and the current second term will be the sum of the previous first and second terms. However, if the current bit in k is 1, the current first term will be the sum of the previous first and second terms and the current second term will be double the previous second term.

For example, starting with the pair (mP,(m+1)P), at the next step, if the current bit in k is 0, the current pair is then (2*mP, mP+(m+1)P)=(2mP, (2m+1)P). Alternatively, if the current bit in k is 1, the current pair is then (mP+(m+1)P, 2*(m+1)P) =((2m+1)P, (2m+2)P). As you can see, each step includes a doubling operation and an addition operation. The sequence continues for each bit. until the last bit in k, and at that point, the first term of the current pair (e.g. the first term of the last pair computed) contains the desired value for kP.

An example of Montgomery's method is shown in FIG. 1. In the example shown in FIG. 1, k=45=$101101_2$. The sequence starts with the pair (P, 2P) and for i=5 down to i=0, a new pair is computed for the current bit in k.

To illustrate the general methodology used above, reference is made to step i=3, where the current bit in k is 1 and the previous pair is (2P, 3P) (i.e. from step i=4). Since the current bit is 1, the current first term is computed as 2P+3P=5P, as shown in the chart of FIG. 1 at step i=3. The current second term is computed as 2*3P=6P, which is also shown in the chart. Another way to compute the terms is based on the value of m, which for this step equals two (2) (i.e. the coefficient of P in step i=4 is equal to 2). Accordingly, the current first term is calculated as (2*2+1)P=5P, and the current second term is calculated as (2*2+2)P=6P. At step i=0, the value 45P corresponds to the desired value kP, which is what would be expected, since k=45.

In certain elliptic curve cryptographic operations, such as Elliptic Curve Digital Signature Algorithm (ECDSA) verification, a combination of scalar multiplications is calculated to obtain kP+sQ, where Q is another point on the elliptic curve E, and s is another scalar. It is possible to use Montgomery's method to obtain kP+sQ, however, each scalar multiplication would be done separately, and the two resultant values, namely kP and sQ would then be added together to obtain the simultaneous multiplication kP+sQ. Therefore, to obtain kP+sQ individual doubling operations and addition operations are required for each bit in both k and s.

Since scalar multiplication can dominate the execution time of elliptic curve cryptographic schemes, the above-mentioned use of Montgomery's method for such a verification step would likely be considered inefficient in typical applications.

It is therefore an object of the present invention to obviate or mitigate at least one of the above described disadvantages.

SUMMARY OF THE INVENTION

A method for simultaneous point multiplication is provided which is of particular use with Montgomery's method. The method reduces the number of doubling operations and in certain cases the number of addition operations when compared to using Montgomery's method separately for each point multiple.

In one aspect, a method for simultaneously performing a first multiplication of a first scalar k by first point P on an elliptic curve E, and a second multiplication of a second scalar s by a second point Q on the elliptic curve E is provided. The method comprises for t bit pairs $(k_i, s_i)$, where t represents the total number of bits in the scalars and i represents the current bit being evaluated in the first and second scalars, simultaneously performing at least one repetitive operation in the first and second multiplications according to the values indicated in each bit pair $(k_i, s_i)$ to thereby reduce the number of mathematical operations at each step in the multiplications.

In another aspect, a method for simultaneously performing a first multiplication of a first scalar k by first point P on an elliptic curve E, and a second multiplication of a second scalar s by a second point Q on the elliptic curve E, the first and second scalars having different bit lengths is provided. The method comprises padding the shorter of the first and second scalars with v zeros such that each scalar comprises t bits, where t represents the total number of bits in the largest bit length; discarding the most significant bit in the first scalar k, and discarding the most significant bit in the second scalar s; for v−1 bit pairs $(k_i, s_i)$ comprising non-discarded padded zeros, where i represents the current bit being evaluated in the first and second scalars, performing Montgomery's method for the longer of the first and second scalars; and for the remaining t−v−1 bit pairs $(k_i, s_i)$. simultaneously performing at least one repetitive operation in the first and second multiplications for the bit pair $(k_i, s_i)$ according to the values indicated in the bit pair $(k_i, s_i)$ to thereby reduce the number of mathematical operations at each step in the multiplications.

BRIEF DESCRIPTION OF THE DRAWINGS

An embodiment of the invention will now be described by way of example only with reference to the appended drawings wherein:

FIG. 3 is a chart illustrating an embodiment of a simultaneous scalar multiplication method.

FIG. 4 is a chart illustrating another embodiment of the simultaneous scalar multiplication method illustrated in FIG. 3.

DETAILED DESCRIPTION OF THE INVENTION

Figures 1, 2:
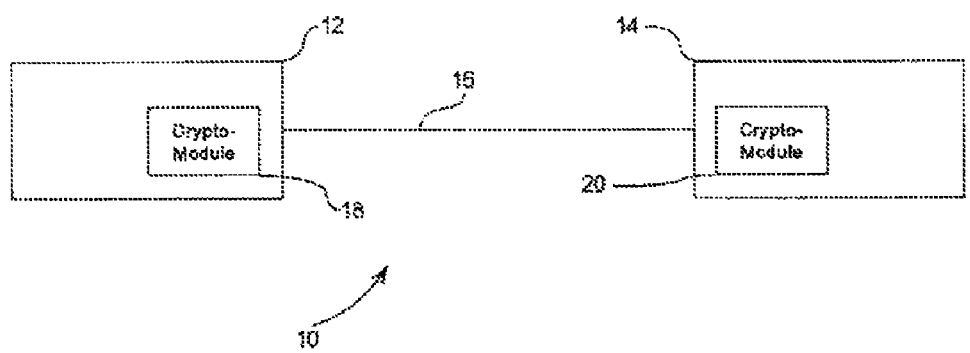
FIG. 1 is a chart illustrating an implementation of Montgomery's method for scalar multiplication.
FIG. 2 is a cryptographic communication system.

Referring therefore to FIG. 2, a cryptographic communication system is generally denoted by numeral 10. The system 10 has a first correspondent 12 and a second correspondent 14 that may communicate with each other over a communication channel 16. The communication channel 16 may or may not be secure. Each correspondent has a cryptographic module 18 and 20 respectively, for performing cryptographic operations.

Preferably, each cryptographic module 18 and 20 is capable of performing elliptic curve cryptographic operations such as point multiplication of one or more integer and one or more point on the elliptic curve E defined over a field $\mathbb{F}$. Such cryptographic operations include, for example, the ECDSA, and steps performed therefor. The embodiments described herein are particularly suitable for ECDSA verification where the combination kP+sQ is calculated, and when no pre-computed tables are available for P and Q.

It will be appreciated that the embodiments described herein may also be used for other cryptographic operations involving, multiple point multiplication, and should not be limited to computing the combination kP+sQ for ECDSA verification, as described herein.

When computing kP and sQ separately using Montgomery's method, the applicants have discovered that several operations are repeated in computing kP and sQ that could be executed with a single operation. The following discusses a simultaneous scalar multiplication method that reduces the overall number of doubling and addition operations thereby providing an efficient method for multiple scalar multiplication.

In the present simultaneous scalar multiplication method, the pairs used in computing kP and sQ are combined to create the single computation pair: (mP+nQ, (m+1)P+(n+1)Q). The starting pair, where m=n=1, is thus (P+Q, 2(P+Q)), and the most significant bits in k and s are discarded. For all pairs in this method, the second component differs from the first component by P+Q. This fact allows for the use of more efficient formulae for point doubling and point addition.

In this embodiment, the integers k and s are represented by a series of binary bits. Accordingly, at each step of the simultaneous method, a bit pair $(k_i, s_i)$ is referenced, one bit from k, and one bit from s. With two bits being referenced at each step, and each bit having a binary representation therefor, the possible bit pairs in this example are (0,0), (1,1), (0,1) and (1,0). In general, there are t bits in each scalar, and the evaluation proceeds from i=t−1 down to i=0, e.g. where $k_t$ is the most significant bit and $k_0$ is the least significant bit.

When the bit pairs are (0,0) and (1,1), similar operations are performed for k and s, and as such, one doubling operation can be performed on both P and Q at the same time, and one addition of the terms in the previous pair. Therefore, since only one doubling and one addition are required to operate on P and Q, the present simultaneous scalar multiplication of kP+sQ when the bit pairs are (0,0) and (1,1) requires one half of the doubling operations and one half of the addition operations.

When the bit pair is (0,0), each of the current first terms for P and Q require a doubling operation of the previous first terms, and each of the second terms becomes the sum of the previous first and second terms. Accordingly, beginning with the pair (mP+nQ, (m+1)P+(n+1)Q), the next pair when the current bits in both k and s are zero (0) is (2*(mP+nQ), mP+nQ+(m+1)P+(n+1)Q, which simplifies to:

Case 1 (0,0): (2mP+2nQ, (2m+1)P+(2n+1)Q);

where in and n are the coefficients of P and Q respectively in the previous step.

When the bit pair is (1,1), each of the current first terms for P and Q become the sum of the previous first and second terms, and each of the second terms requires a doubling of the previous second term. Accordingly, beginning with the pair (mP+nQ, (m+1)P+(n+1)Q), the next pair when the current bits in both k and s are one (1) is (mP+nQ+(m+1)P+(n+1)Q, 2*((m+1)P+(n+1)Q)), which simplifies to:

Case 2 (1,1): ((2m+1)P+(2n+1)Q, (2m+2)P+(2n+2)Q);

where m and n are the coefficients of P and Q respectively in the previous step.

Therefore, in the case where the bits in k and s are the same, one half of the operations are needed to calculate the current step in the sequence computing kP+sQ, thereby increasing the computational efficiency for multiple point scalar multiplication.

When the bit pairs are (0,1) and (1,0), different operations are required for kP and sQ, however, certain repetitions can be avoided, in particular repeated doubling operations. The present simultaneous scalar multiplication of kP+sQ when the bit pairs are (0,1) and (1,0) requires only half of the doubling operations, and thus requires three quarters of the overall operations.

When the bit pair is (0,1), the current first terms for P and Q require a doubling and an addition operation respectively, and the current second terms for P and Q require the opposite. To accommodate both P and Q simultaneously, the applicants have discovered that the current first term can be computed by doubling the previous first term and adding Q, and the current second term can be computed by adding (P+Q) to the current first term, thereby requiring only one doubling and two additions. Accordingly, beginning with the pair (mP+nQ, (m+1)P+(n+1)Q), the next pair (where the current bit in k is zero (0) and the current bit in s is one (1)) is (2*(mP+nQ)+Q, 2*(mP+nQ)+Q+(P+Q)), which simplifies to:

Case 3 (0,1): (2mP+2nQ+Q, (2m+1)P+(2n+1)Q+Q);

where m and n are the coefficients of P and Q respectively in the previous step.

Where the bit pair is (1,0), the current first terms for P and Q require an addition and doubling operation respectively, and the current second terms for P and Q require the opposite. To accommodate both P and Q simultaneously, the applicants have discovered that the current first term can be computed by doubling the previous first term and adding P, and the current second term can be computed by adding (P+Q) to the current first term, thereby requiring only one doubling and two additions. Accordingly, beginning with the pair (mP+nQ, (m+1)P+(n+1)Q), the next pair (when the current bit in k is one (1)

and the current bit in s is zero (0)) is (2*(mP+nQ)+P, 2*(mP+nQ)+P+(P+Q)), which simplifies to:

Case 4 (1,0): (2mP+2nQ+P, (2m+1)P+P+(2n+1)Q);

where m and n are the coefficients of P and Q respectively in the previous step.

Therefore, in the cases where the bits in k and s are different, three quarters of the operations are needed to calculate the current step in the sequence computing kP+sQ, thereby increasing the computational efficiency for multiple point scalar multiplication.

The sequence continues for each bit pair (evaluating which case above is required), until the least significant bits in k and s, and at that point, the current pair (e.g. the last pair computed) contains the desired value kP+sQ as its first term.

An example of the embodiment described above is shown in FIG. 3. In the example shown in FIG. 3, k=45=101101$_2$, s=54=110110$_2$, and k and s have the same bit length, where t=6. The sequence starts with the pair (P+Q, 2P+2Q) and for i=5 down to i=0, a new pair is computed for the current bit pair as follows.

The most significant bit in k and the most significant bit in s are discarded and the . first computation is made at step i=4. At this step, the current bit in k is zero (0), the current bit in s is one (1), and the previous pair (i.e. the starting pair) is (P+Q2,P+2Q). Since the current bit pair is (0,1), the current first term is computed by doubling the previous first term and adding Q, namely, 2*P+2*Q+Q=2P+3Q as shown in the chart of FIG. 3 at step i=2. The current second term is computed by adding (P+Q) to the current first term, namely, 2P+3Q+(P+Q)=3P+4Q, which is also shown in the chart. Another way to compute the terms is based on the values of m and n. which at this step equal 1 and 1 respectively (i.e. the coefficients of P and Q in step i=5). Accordingly, the current first term is calculated as 2*1P+2*1Q+Q=2P+3Q, and the current second term is calculated as (2*1+1)P+(2*1+1)Q+Q=3P+4Q; as was calculated above.

At step i=3, the current bit in k is one (1), the current bit in s is zero (0), and the previous pair is (2P+3Q, 3P+4Q). Since the current bit pair is (1,0), the current first term is computed by doubling the previous first term and adding P, namely, 2*2P+2*3Q+P=5P+6Q as shown in the chart of FIG. 3 at step i=3. The current second term is computed by adding (P+Q) to the current first term, namely, 5P+6P+(P+Q)=6P+7Q, which is also shown in the chart. It will be appreciated that the pair can also be calculated based on the values of m and n as illustrated above.

At step i=2, the current bit in k is one (1), the current bit in s is one (1), and the previous pair is (5P+6P, 6P+7Q). Since the current bit pair is (1,1), the current first term is computed as the sum of the previous terms, namely, 5P+6P+6Q+7Q=11P+13Q, as shown in the chart of FIG. 3 at step i=2. The current second term is computed by doubling the previous second term, namely, 2*6P+2*7Q=12P+14Q, which is also shown in the chart. it will be appreciated that the pair can also be calculated based on the values of m and n as illustrated above.

At step i=1, the current bit in k is zero (0), the current bit in s is one (1), and the previous pair is (11P+13Q, 12P+14Q). Since the current bit pair is (0,1), the current first term is computed by doubling the previous first term and adding Q, namely, 2*11P+2*13Q+Q=22P+27Q as shown in the chart of FIG. 3 at step i=1. The current second term is computed by adding (P+Q) to the current first term, namely, 22P+27Q+(P+Q)=23P+28Q, which is also shown in the chart. It will be appreciated that the pair can also be calculated based on the values of m and n as illustrated above.

Finally, at step i=0, the current bit in k is one (1), the current bit in s is zero (0), and the previous pair is (22P+27Q, 23P+28Q). Since the current bit pair is (1,0), the current first term is computed by doubling the previous first term and adding P, namely, 2*22P+2*27Q+P=45P+54Q as shown in the chart of FIG. 3 at step i=0. The current second term is computed by adding (P+Q) to the current first term, namely, 45P+54Q+(P+Q)=46P+54Q, which is also shown in the chart. It will be appreciated that the pair can also be calculated based on the values of in and n as illustrated above.

The value 45P+54Q (i.e. the first term in the last pair) corresponds to the desired combination kP+sQ, which is what would be expected, since k=45 and s=54.

In another embodiment shown in FIG. 4, the bit lengths of k and s are different, where k=5=101$_2$, and s=109=1101101$_2$). In this case, k is padded with v zeros at the front such that the bit lengths then become equal. As shown in the chart, for the steps i=6 down to i=2 (i.e. for the padded zeros and the first term in k), Montgomery's method is performed for Q only (i.e. for the scalar having the longer bit length and thus no padded zeros).

Accordingly, the sequence begins at step i=6 with the pair (Q, 2Q). The most significant bits are discarded, therefore, the first computation is made at step i=5. Since the bit in k at step i=5 is a padded zero, only the bit in s is looked at. At this step, the bit in s is one (1), and the previous pair (i.e. the first pair) is (Q, 2Q). Since the bit in s is one (1), the current first term is computed as the sum of the previous terms, namely as Q+2Q=3Q as shown in the chart of FIG. 4 at step i=5. The current second term is computed by doubling the previous second term, namely, 2(2Q)=4Q as also shown in the chart. It will be appreciated that the pair can also be calculated based on the value of n.

At step i=4, the bit in k is also a padded zero, therefore, only the bit in s is looked at. At this step, the bit in s is zero (0), and the previous pair is (3Q, 4Q). Since the hit in s is zero (0), the current first term is computed as double the previous first term, namely as 2*3Q=6Q as shown in the chart of FIG. 4 at step i=4. The current second term is computed as the sum of the previous terms, namely, 3Q+4Q=7Q as also shown in the chart. It will be appreciated that the pair can also be calculated based on the value of n.

At step i=3, the bit in k is the final padded zero for this sequence, therefore, only the bit in s is looked at. At this step, the bit in s is one (1), and the previous pair is (6Q, 7Q). Since the bit in s is one (1), the current first term is computed as the sum of the previous terms, namely as 6Q+7Q=13Q as shown in the chart of FIG. 4 at step i=3. The current second term is computed by doubling the previous second term, namely, 2(7Q)=14Q as also shown in the chart. It will be appreciated that the pair can also be calculated based on the value of n.

At step i=2, the bit in k is no longer a padded zero, but an actual value. Therefore, this pair is the first pair in the simultaneous multiplication, the first bit in k is discarded, and the pair (P, 2P) is added to the current Q values. The current Q values are calculated by looking at the current value in s, which is one (1) and the previous pair, which is (13Q, 14Q). Since the bit in s is one (1), the Q portion of the current first term is computed as the sum of the previous terms, namely as 13Q+14Q=27Q as shown in the chart of FIG. 4 at step i=2. The Q portion of the current second term is computed by doubling the previous second term, namely, 2(14Q)=28Q as also shown in the chart. It will be appreciated that the pair can also be calculated based on the value of n. The complete pair is then derived by adding (P, 2P) to the current Q values resulting in (P+27Q, 2P+28Q) as shown in the chart.

The next step (i.e. the second step in the simultaneous multiplication portion) then utilizes the current bit pair (0,0) at i=1, where the previous pair is (P+27Q, 2P+28Q). Since the bit pair is (0,0), the current first term is computed by doubling the previous first term, namely. 2*P+2*27Q=2P+54Q as shown in the chart of FIG. 4 at step i=1. The current second term is computed as the sum of the previous terms, namely, P+27Q+2P+28Q=3P+55Q, which is also shown in the chart. It will be appreciated that the pair can also be calculated based on the values of m and n as illustrated above.

Finally, at step i=0, the current bit pair is (1,1) and the previous pair is (2P+54Q, 3P+55Q). Since the bit pair is (1,1), the current first term is computed as the sum of the previous terms, namely, 2P+54Q+3P+55Q=5P+109Q as shown in the chart of FIG. 4 at step i=0. The current second term is computed by doubling the previous second term, namely, 2*3P+2*55Q=6P+110Q, which is also shown in the chart. It will be appreciated that the pair can also be calculated based on the values of m and n as illustrated above.

The value 5P+109Q (i.e. the first term in the last pair) corresponds to the desired combination kP+sQ, which is what would be expected, since k=5 and s=109. Accordingly, the present simultaneous point multiplication method can also be readily implemented for integers of different bit lengths.

Although the invention has been described with reference to certain specific embodiments, various modifications thereof will be apparent to those skilled in the art without departing from the spirit and scope of the invention as outlined in the claims appended hereto.

The invention claimed is:

1. A method of operating a cryptographic unit to perform a cryptographic operation in a cryptographic communication system by simultaneously performing a first multiplication of a first scalar k by a first point P on an elliptic curve E, and a second multiplication of a second scalar s by a second point Q on said elliptic curve E, wherein said first scalar k comprises one or more binary bits $k_i$ and said second scalar s comprises one or more binary bits $s_i$, wherein i represents a common bit position in said first scalar k and said second scalar s, said cryptographic operation comprising:
    generating an initial computation pair comprising a first term and a second term by:
        adding respective first terms from Montgomery forms of the first multiplication and the second multiplication; and
        adding respective second terms from the Montgomery forms for the first multiplication and the second multiplication; and
    beginning with the initial computation pair, for each bit pair ($k_i$, $s_i$), computing a next computation pair using a previous computation pair by:
    if the bit pair is (0,0) generating the next computation pair by:
        doubling the first term of the previous computation pair to obtain the first term of the next computation pair; and
        adding the first term and the second term of the previous computation pair to obtain the second term of the next computation pair;
    if the bit pair is (1,1), generating the next computation pair by:
        adding the first term and the second term of the previous computation pair to obtain the first term of the next computation pair; and
        doubling the second term of the previous computation pair to obtain the second term of the next computation pair;
    if the bit pair is (0,1), generating the next computation pair by:
        doubling the first term of the previous computation pair and adding the second point Q to obtain the first term of the next computation pair; and
        adding the first point P and the second point Q to the first term of the next computation pair; and
    if the bit pair is (1,0), generating the next computation pair by:
        doubling the first term of the previous computation pair and adding the first point P to obtain the first term of the next computation pair; and
        adding the first point P and the second point Q to the first term of the next computation pair.

2. The method according to claim 1 further comprising discarding the most significant bit in said first scalar k, and discarding the most significant bit in said second scalar s.

3. The method according to claim 1 wherein the computation pairs comprise the form [mP+nQ, (m+1)P+(n+1)Q], wherein m represents the coefficient of said first point P in the previous computation pair and n represents the coefficient of said second point Q in the previous computation pair, and wherein for each computation pair, the second term differs from the first term by (P+Q).

4. The method according to claim 3 wherein when said bit pair ($k_i$, $s_i$) currently equals (0,0), the next computation pair is [2mP+2nQ, (2m+1)P+(2n+1)Q].

5. The method according to claim 3 wherein when said bit pair ($k_i$, $s_i$) currently equals (1,1), the next computation pair is [(2m+1)P+(2n+1)Q, (2m+2)P+(2n+2)Q].

6. The method according to claim 3 wherein when said bit pair ($k_i$, $s_i$) currently equals (0,1), the next computation pair is [2mP+2nQ+Q, (2m+1)P+(2n+1)Q+Q].

7. The method according to claim 3 wherein when said bit pair ($k_i$, $s_i$) currently equals (1,0), the next computation pair is [2mP+2nQ+P, (2m+1)P+P+(2n+1)Q].

8. The method according to claim 1 wherein said scalars k, s, comprise the same number of bits.

9. The method according to claim 1 wherein said scalars k, s, comprise a different number of bits, said method further comprising generating said initial computation pair by:
    determining which of said scalars k, s, comprises fewer bits;
    padding the scalar having fewer bits with zeros such that the bit lengths of the scalars k, s become equal; and
    performing Montgomery's method on the bits of the other scalar that correspond to the zeros in the other scalar;
    wherein the initial computation pair corresponds to the first pair after the padding.

10. A cryptographic unit configured to perform a cryptographic operation in a cryptographic communication system by simultaneously performing a first multiplication of a first scalar k by a first point P on an elliptic curve E, and a second multiplication of a second scalar s by a second point Q on said elliptic curve E, wherein said first scalar k comprises one or more binary bits $k_i$ and said second scalar s comprises one or more binary bits $s_i$, wherein i represents a common bit position in said first scalar k and said second scalar s, said cryptographic unit comprising:
    a cryptographic module configured to generate an initial computation pair comprising a first term and a second term by:
        adding respective first terms from Montgomery forms of the first multiplication and the second multiplication; and adding respective second terms from the Montgomery forms for the first multiplication and the second multiplication; and beginning with the initial computation pair, for each bit pair ($k_i$, $s_i$), the cryptographic module configured to compute a next computation pair using a previous computation pair by:

if the bit pair is (0,0) generating the next computation pair by:

doubling the first term of the previous computation pair to obtain the first term of the next computation pair; and adding the first term and the second term of the previous computation pair to obtain the second term of the next computation pair;

if the bit pair is (1,1), generating the next computation pair by:

adding the first term and the second term of the previous computation pair to obtain the first term of the next computation pair; and doubling the second term of the previous computation pair to obtain the second term of the next computation pair;

if the bit pair is (0,1), generating the next computation pair by:

doubling the first term of the previous computation pair and adding the second point Q to obtain the first term of the next computation pair; and adding the first point P and the second point Q to the first term of the next computation pair; and if the bit pair is (1,0), generating the next computation pair by:

doubling the first term of the previous computation pair and adding the first point P to obtain the first term of the next computation pair; and adding the first point P and the second point Q to the first term of the next computation pair.

11. The cryptographic unit according to claim 10 wherein the cryptographic module is further configured to discard the most significant bit in said first scalar k, and discarding the most significant bit in said second scalar s.

12. The cryptographic unit according to claim 10 wherein the computation pairs comprise the form [mP+nQ, (m+1)P+(n+1)Q], wherein m represents the coefficient of said first point P in the previous computation pair and n represents the coefficient of said second point Q in the previous computation pair, and wherein for each computation pair, the second term differs from the first term by (P+Q).

13. The cryptographic unit according to claim 12 wherein when said bit pair ($k_i$,$s_i$) currently equals (0,0), the next computation pair is [2mP+2nQ, (2m+1)P+(2n+1)Q].

14. The cryptographic unit according to claim 12 wherein when said bit pair ($k_i$, $s_i$) currently equals (1,1), the next computation pair is [(2m+1)P+(2n+1)Q, (2m+2)P+(2n+2)Q].

15. The cryptographic unit according to claim 12 wherein when said bit pair ($k_i$, $s_i$) currently equals (0,1), the next computation pair is [2mP+2nQ+Q, (2m+1)P+(2n+1)Q+Q].

16. The cryptographic unit according to claim 12 wherein when said bit pair ($k_i$, $s_i$) currently equals (1,0), the next computation pair is [2mP+2nQ+P, (2m+1)P+P+(2n+1)Q].

17. The cryptographic unit according to claim 10 wherein said scalars k, s, comprise the same number of bits.

18. The cryptographic unit according to claim 10 wherein said scalars k, s, comprise a different number of bits, said cryptographic module is further configured to generate said initial computation pair by:

determining which of said scalars k, s, comprises fewer bits;

padding the scalar having fewer bits with zeros such that the bit lengths of the scalars k, s become equal; and performing Montgomery's method on the bits of the other scalar that correspond to the zeros in the other scalar;

wherein the initial computation pair corresponds to the first pair after the padding.

19. A non-transitory computer readable medium having stored thereon computer readable instructions for configuring a cryptographic unit to perform a cryptographic operation in a cryptographic communication system by simultaneously performing a first multiplication of a first scalar k by a first point P on an elliptic curve E, and a second multiplication of a second scalar s by a second point Q on said elliptic curve E, wherein said first scalar k comprises one or more binary bits $k_i$ and said second scalar s comprises one or more binary bits $s_i$, wherein i represents a common bit position in said first scalar k and said second scalar s, said cryptographic operation comprising:

generating an initial computation pair comprising a first term and a second term by:

adding respective first terms from Montgomery forms of the first multiplication and the second multiplication; and adding respective second terms from the Montgomery forms for the first multiplication and the second multiplication; and beginning with the initial computation pair, for each bit pair ($k_i$, $s_i$), computing a next computation pair using a previous computation pair by:

if the bit pair is (0,0) generating the next computation pair by:

doubling the first term of the previous computation pair to obtain the first term of the next computation pair; and adding the first term and the second term of the previous computation pair to obtain the second term of the next computation pair;

if the bit pair is (1,1), generating the next computation pair by:

adding the first term and the second term of the previous computation pair to obtain the first term of the next computation pair; and doubling the second term of the previous computation pair to obtain the second term of the next computation pair;

if the bit pair is (0,1), generating the next computation pair by:

doubling the first term of the previous computation pair and adding the second point Q to obtain the first term of the next computation pair; and adding the first point P and the second point Q to the first term of the next computation pair; and if the bit pair is (1,0), generating the next computation pair by:

doubling the first term of the previous computation pair and adding the first point P to obtain the first term of the next computation pair; and adding the first point P and the second point Q to the first term of the next computation pair.

20. The non-transitory computer readable medium according to claim 19 wherein the cryptographic operation further comprises discarding the most significant bit in said first scalar k, and discarding the most significant bit in said second scalar s.

21. The non-transitory computer readable medium according to claim 19 wherein the computation pairs comprise the form [mP+nQ, (m+1)P+(n+1)Q], wherein m represents the coefficient of said first point P in the previous computation pair and n represents the coefficient of said second point Q in the previous computation pair, and wherein for each computation pair, the second term differs from the first term by (P+Q).

22. The non-transitory computer readable medium according to claim 21 wherein when said bit pair ($k_i$, $s_i$) currently equals (0,0), the next computation pair is [2mP+2nQ, (2m+1)P+(2n+1)Q].

23. The non-transitory computer readable medium according to claim 21 wherein when said bit pair ($k_i$, $s_i$) currently equals (1,1), the next computation pair is [(2m+1)P+(2n+1)Q, (2m+2)P+(2n+2)Q].

24. The non-transitory computer readable medium according to claim 21 wherein when said bit pair ($k_i$, $s_i$) currently equals (0,1), the next computation pair is [2mP+2nQ+Q, (2m+1)P+(2n+1)Q+Q].

25. The non-transitory computer readable medium according to claim 21 wherein when said bit pair ($k_i$, $s_i$) currently equals (1,0), the next computation pair is [2mP+2nQ+P, (2m+1)P+P+(2n+1)Q].

26. The non-transitory computer readable medium according to claim 19 wherein said scalars k, s, comprise the same number of bits.

27. The non-transitory computer readable medium according to claim 19 wherein said scalars k, s, comprise a different number of bits, said cryptographic operation further comprising generating said initial computation pair by:
determining which of said scalars k, s, comprises fewer bits;
padding the scalar having fewer bits with zeros such that the bit lengths of the scalars k, s become equal; and
performing Montgomery's method on the bits of the other scalar that correspond to the zeros in the other scalar;
wherein the initial computation pair corresponds to the first pair after the padding.

* * * * *